C. W. PARKHURST & F. J. BURD.
CONTROLLER FOR MOTOR DRIVEN MACHINES.
APPLICATION FILED FEB. 8, 1917.
1,301,966.
Patented Apr. 29, 1919.
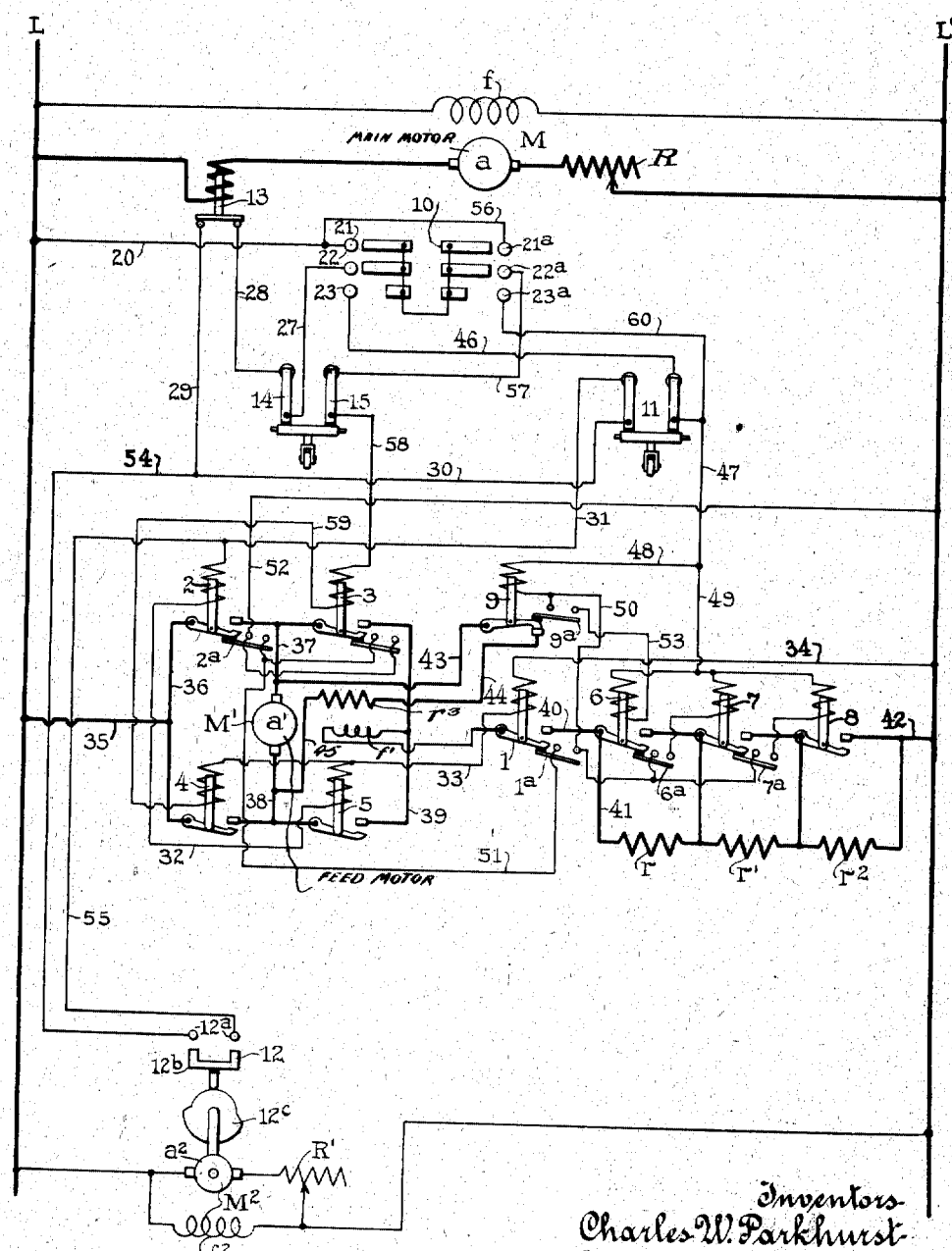

UNITED STATES PATENT OFFICE.

CHARLES W. PARKHURST, OF JOHNSTOWN, AND FRANCIS J. BURD, OF WILKINSBURG, PENNSYLVANIA, ASSIGNORS TO THE CUTLER-HAMMER MFG. CO., OF MILWAUKEE, WISCONSIN, A CORPORATION OF WISCONSIN.

CONTROLLER FOR MOTOR-DRIVEN MACHINES.

1,301,966.  Specification of Letters Patent.  Patented Apr. 29, 1919.

Application filed February 8, 1917. Serial No. 147,341.

*To all whom it may concern:*

Be it known that we, CHARLES W. PARKHURST and FRANCIS J. BURD, respectively, a citizen of the United States and a subject of the King of England, residing, respectively, at Johnstown, in the county of Cambria and State of Pennsylvania and Wilkinsburg, county of Allegheny, and State of Pennsylvania, have invented new and useful Improvements in Controllers for Motor-Driven Machines, of which the following is a full, clear, concise, and exact description, reference being had to the accompanying drawing, forming a part of this specification.

This invention relates to controllers for motor driven machines and is particularly applicable to motor driven saw machines of the sliding frame type.

In a machine of this type, the sliding frame carries the saw and its driving motor while a so-called "feed" motor is employed to slide the frame for movement of the saw toward and away from its work. In practice, it is desired to advance the saw to its work at an accelerated speed, then to continue its advance at a relatively slow speed for the cutting operation and then to return the same at an accelerated speed. Also, it is often desired to utilize such a machine for cutting various materials offering varying resistance to the saw, whereas it is essential to the protection of the saw and its driving motor to limit the speed of its feed according to the resistance offered thereto. Thus, while it has been found that a series motor, due to its inherent tendency to slow down under heavy loads and to quickly accelerate under light loads, is particularly advantageous for use as a feed motor in such a machine, much difficulty has been experienced in adjusting the speed of the feed motor to varying working conditions, especially in view of the fact that speed curtailment of a series motor is limited for practical purposes by the torque curtailment incident thereto. Manual regulation of the feed motor has been attempted but such method of regulation is open to obvious objections and it has also been proposed to employ a variable speed feed motor and speed regulating means, including a relay, in circuit with the saw driving motor to adjust said feed motor to working conditions. Such regulating means, however, is inadequate in some instances especially where a plain series feed motor is employed and where the torque requirements preclude a reduction in the speed of the motor sufficient to meet working conditions.

The present invention has among its objects to overcome the aforesaid difficulties in controlling such a machine and to provide automatic control means whereby with the use of a series motor the speed of the driven part may be readily curtailed as desired and automatically adjusted to working conditions to protect the machine against injury from jamming.

A further object is to provide means whereby the sliding frame of such a machine may be moved at an accelerated speed to advance the saw toward its work and automatically slowed down to the proper cutting speed at a critical moment.

Various other objects and advantages of the invention will hereinafter appear.

The accompanying drawing illustrates diagrammatically a controller embodying the invention, said controller being designed particularly for a saw machine.

Referring to the drawing, the same illustrates diagrammatically two motors M and M′, the former constituting the saw driving motor and the latter the feed motor. The motor M is of the shunt type having an armature $a$ and a shunt field winding $f$, said motor to be controlled in any suitable manner, as by an adjustable rheostat R. The motor M′, on the other hand, is of the series type, being provided with an armature $a'$ and a series field winding $f'$, the control means illustrated being provided exclusively for this motor.

The control means includes an electromagnetic switch 1 controlling the continuity of circuit of motor M′, electromagnetic reversing switches 2, 3, 4 and 5, electromagnetic accelerating switches 6, 7 and 8 respectively controlling series resistances $r$, $r'$ and $r^2$, an electromagnetic switch 9 controlling an armature shunt resistance $r^3$ and a drum type master switch 10 to control said electromagnetic switches. As will hereinafter appear, the switch 10 governs the electromagnetic switches to start the motor for reverse operations and to alternatively effect operation of the motor with all of the resistances $r$ to $r^3$ included in circuit or with the resistances $r$ to $r^2$ excluded from circuit and the armature shunt interrupted, thereby providing for either an accelerated or a reduced speed drive of the sliding frame. In addition the controller includes a limit switch 11 to effect inclusion of said resistances in a predetermined position of the sliding frame, a motor driven contact device 12 and an electro-responsive relay 13, both rendered effective and ineffective by the switch 11, and limit switches 14 and 15 to respectively effect interruption of the motor circuit at the forward and return limits of the sliding frame.

The motor driven device 12 comprises a pair of contacts $12^a$, a bridging contact $12^b$, a cam $12^c$ to effect engagement and disengagement of said contacts and a motor $M^2$ to rotate said cam. The motor $M^2$ is of the shunt type having an armature $a^2$ and shunt field winding $f^2$ and is provided with a rheostat R' to regulate the speed thereof. This motor is shown as connected directly across lines L and L' and hence operates entirely independently of the other motors. The contacts of this device upon tripping of the switch 11 to slow down the motor, are included in circuit with the winding of main switch 1 and upon operation of said device serve to periodically deënergize and reënergize said main switch. This results in limiting the motor M' to an intermittent operation to impart a step by step movement to the saw frame. Thus, while it might be impracticable to reduce the speed of the series motor M' to a slow speed suitable for continuous drive of the saw frame, because of the loss of torque due to such a speed reduction, the aforesaid restriction of said motor to an intermittent operation enables the movement of the saw frame to be readily reduced without such a loss of torque. The device 12 may be adjusted by speed regulation of its driving motor, or in any other preferred way, to regulate the periods of operation and arrest of the motor M' and thereby restrict the advance of the saw frame to any maximum slow speed.

The relay 13 likewise has its contacts included in circuit with the winding of the main switch upon tripping of the slow down limit switch and in series with the contacts of the device 12. This relay is of the normally closed type and has its winding included in series with the armature of the saw driving motor M. It is calibrated to respond at a predetermined current value preferably that corresponding to the maximum safe jamming of the saw against its work and to release upon a relatively slight decrease in current below such value. Thus whereas the device 12 tends to restrict the advance of the saw frame to a predetermined maximum slow speed said relay functions to further retard the advance of said frame under excessive load conditions, the degree of retardation effected thereby varying with the duration of abnormal load conditions. Consequently the device 12 and relay 13 coact to adjust the speed of the saw frame to working conditions entirely automatically and in an entirely safe and reliable manner.

More specifically describing the diagram and assuming full movement of the master switch to the left, establishment of the following circuits is effected to cause full speed operation of the motor driven frame toward the work: first, circuit is completed from line L by conductor 20 through contacts 21 and 22 of the switch 10, by conductor 27 through forward limit switch 14, by conductor 28 through the contacts of relay 13, by conductors 29 and 30 through the left hand pole of slow down switch 11, by conductor 31 through the winding of reversing switch 2, by conductor 32 through the winding of reversing switch 5, by conductor 33 through the winding of main switch 1, by conductor 34 to line L'. This provides for energization of switches 2, 5 and 1 and consequent completion of the circuit of motor M'-from line L by conductors 35 and 36 through switch 2, by conductor 37 through the armature of said motor, by conductor 38 through switch 5, by conductor 39 through the field winding of said motor and main switch 1, by conductors 40 and 41 through the resistance $r$, $r'$ and $r^2$, by conductor 42 to line L'. Also, at the instant of completion of the motor circuit, a shunt may be traced around the armature from its upper terminal by conductor 43 through switch 9, by conductor 44 through resistance $r^3$, by conductor 45 to its opposite terminal. However, upon closure of the switches 2 and 1 a circuit is immediately established from contact 23 of the master switch, by conductor 46 through the right hand pole of the slow down switch 11, to conductor 47 and thence by parallel branches 48 and 49 to the windings of the armature shunt switch and the accelerating switches. Tracing the return circuit of the armature shunt switch, the same extends by conductor 50 through auxiliary contacts $1^a$ of the main switch, by conductor 51 through auxiliary contacts $2^a$ of reversing switch 2, by conductor 52 to line L'. This provides for immediate response of the switch 9 to interrupt the armature shunt and to complete the return circuit for the accelerating switch 6 by conductor 53 through its auxiliary contacts $9^a$ to conductor 50, thus joining the return circuit of said switch 9. This provides for energization of accelerating switch 6 to exclude the series resistance $r$ and through its auxiliary contacts $6^a$ to complete the return circuit of the winding of accelerating switch 7. This effects response of switch 7 to short-circuit the resistance $r'$ and through its auxiliary contacts 7ª to complete the return circuit of the winding of switch 8. This effects response of the switch 8 to short circuit the resistance $r^2$ to bring the motor M' up to maximum speed. The motor then continues to operate at maximum speed until the slow down switch 11 is tripped, which at once deënergizes the shunt switch 9, said switch in turn deënergizing all of the accelerating switches.

Also, tripping of the slow down switch throws the main switch and reversing switches 2 and 5 onto a maintaining circuit including the contacts of the motor driven device 12. This circuit extends from line L through the forward limit switch 14 to conductor 29, as already traced, thence by conductor 54 through the contacts 12ª of said device 12, by conductor 55 to the windings of switches 2, 5 and 1. Accordingly the device 12 serves to thereafter deënergize and reënergize said switches at definite intervals, assuming continued closure of relay 13, whereas the relay upon responding serves to at once deënergize said switches and to delay reënergization thereof until normal load conditions in the circuit of the saw driving motor are restored. Then when the cutting operation is completed the forward limit switch 14 is tripped to deënergize the main switch and reversing switches thereby stopping the motor.

During the aforesaid high speed operation of the saw frame slow down is effectable at will by partial return movement of the master switch to disengage contacts 23. This produces the same results as tripping of the slow down limit switch.

Return movement of the saw frame is effected by movement of the master switch to the right to an extreme position if high speed is desired, or to its first position if slow speed is desired. Assuming movement of the controller to its extreme position, circuit is completed from line L by conductors 20 and 56 through contacts 21ª and 22ª of said switch, by conductor 57 through the return limit switch 15, by conductor 58 through the winding of switch 3, by conductor 59 through the winding of switch 4, to conductor 33 and thence through the winding of main switch 1 to line L', as already traced. This provides for completion of the motor circuit and reversal of the flow of current through its armature thereby reversing the movement of the saw frame. Also, this positioning of the master switch completes circuit from contact 23ª by conductor 60 to conductor 47 thereby effecting progressive energization of the armature shunting switch 9 and the accelerating switches 6, 7 and 8. On the other hand, if the controller is stopped in its previous position, the last described connections are not established so that the armature shunt and series resistances are maintained in circuit for speed reduction. In either event, when full return movement of the saw carrier has been effected, the limit switch 15 is tripped to deënergize the main switch 1 and reversing switches 3 and 4 to stop the motor.

It is, of course, to be understood that the control means illustrated is susceptible of various modifications and is susceptible of advantageous use in other relations.

What we claim as new and desire to secure by Letters Patent is:

1. The combination with a work performing motor, of means for varying the relation of said motor and its work and automatic control means for the former means to restrict the same to action intermittently in a predetermined manner subject to variation by the load conditions of said motor.

2. The combination with a main work performing motor and a feed motor to vary the relation of said main motor and its work, of control means for said feed motor limiting the same during the work performing period of said main motor to an intermittent operation and to operation only under predetermined load conditions of said main motor.

3. The combination with a main work performing motor and a feed motor to vary the relation of said main motor and its work, of means to periodically effect interruption and recompletion of the circuit of said feed motor throughout the work performing period of said main motor to retard the feeding action of said feed motor.

4. The combination with a main work performing motor and a feed motor to vary the relation of said main motor and its work, of means to periodically effect interruption and recompletion of the circuit of said feed motor throughout the work performing period of said main motor and to retard the feeding action of said feed motor and means responsive under predetermined load conditions of said main motor to further retard the feeding action of said feed motor.

5. The combination with a main work performing motor and a feed motor to vary the relation of said main motor and its work, of means to preiodically interupt and reestablish the power connections of said feed motor throughout the work performing period of said main motor and means responsive to predetermined current variations in the circuit of said main motor to render operation of said feed motor during said period dependent upon predetermined load conditions of said main motor.

6. The combination with a main work performing motor and a feed motor to vary the relation between said former motor and its work, of control means for said main motor to effect operation thereof alternately at a relatively slow speed or at an accelerated speed, automatic means to reduce said feed motor to said relatively slow speed in a given relation of said main motor and its work and throughout the work performing period of said main motor and automatic means to limit said feed motor to intermittent operation throughout said period, said means being ineffective during operation of said feed motor at said accelerated speed.

7. The combination with a main work performing motor and a feed motor to vary the relation of said main motor and its work, of control means for said feed motor enabling operation thereof at a relatively high speed, automatic means to reduce the speed of said feed motor in a given relation of said main motor and its work and to curtail the speed of said feed motor throughout the working period of said main motor, automatic control means for said feed motor to effect intermittent operation thereof throughout said period and automatic control means for said feed motor to temporarily arrest the same under given load conditions of said main motor.

8. The combination with a main work performing motor and a series feed motor to vary the relation between said main motor and its work, of means including series and armature shunt resistances to slow down said feed motor for the work performing period of said main motor and means to restrict said feed motor to intermittent operation during said period to further retard the feeding action thereof.

9. The combination with a main work performing motor and a series feed motor to vary the relation between the former and its work, of means including series and armature shunt resistances to slow down said feed motor for the working period of said main motor, and means to restrict said feed motor to an intermittent operation during said period subject to prolonged arrest under predetermined load conditions of said main motor.

10. The combination with a main work performing motor and a series feed motor to vary the relation of the former motor and its work, of automatic means including series and armature shunt resistances for said feed motor to reduce the speed thereof for the working period of said main motor, automatic means to effect interruption and reestablishment of the power connections of said feed motor periodically during the working period of said main motor and means responsive to variations in the current of said main motor circuit to temporarily arrest said feed motor under predetermined load conditions of said main motor.

11. The combination with a main work performing motor and a feed motor to vary the relation of said main motor and its work, of means to effect operation of said feed motor alternatively at a relatively slow speed or at an accelerated speed, automatic means to periodically interrupt and re-establish the power connections of said feed motor and means normally rendering said last mentioned means ineffective and being operable automatically in a given relation of said main motor and its work to effect reduction of said feed motor to said slow speed and to render the former automatic means effective throughout the work performing period of said main motor.

12. The combination with a main work performing motor and a feed motor to vary the relation of said main motor and its work, of means to effect operation of said feed motor alternatively at a relatively slow speed or at an accelerated speed, automatic means to periodically interrupt and reestablish the power connections of said feed motor, means normally rendering said last mentioned means ineffective and being operable automatically in a given relation of said main motor and its work to effect reduction of said feed motor to said slow speed and to render the former automatic means effective throughout the work performing period of said main motor and other circuit interrupting means for said feed motor responsive upon a predetermined increase in the load imposed upon said main motor.

In witness whereof, we have each hereunto subscribed our names.

CHARLES W. PARKHURST.
FRANCIS J. BURD.

Copies of this patent may be obtained for five cents each, by addressing the "Commissioner of Patents, Washington, D. C."